J. M. CULLEN.

Plow.

No. 4,553.

Patented May 30, 1846.

UNITED STATES PATENT OFFICE.

JNO. M. CULLEN, OF BENTON, MISSISSIPPI.

IMPROVEMENT IN PLOWS.

Specification forming part of Letters Patent No. 4,553, dated May 30, 1846.

*To all whom it may concern:*

Be it known that I, JOHN MERRIL CULLEN, of Benton, in the county of Yazoo and State of Mississippi, have invented a new and useful Improvement in Cotton-Cultivators; and I do hereby declare that the following is a full, clear, and exact description of the principle or character thereof, which distinguishes it from all other things before known, and of the manner of making, constructing, and using the same, reference being had to the accompanying drawings, making part of this specification, in which—

Figure 1:
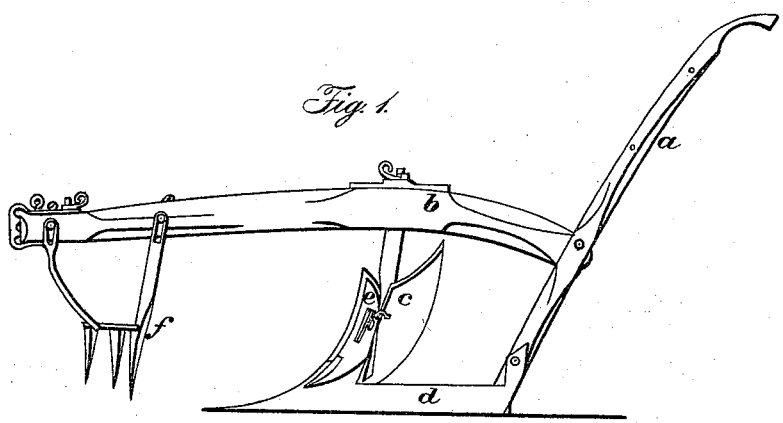
Figure 2:
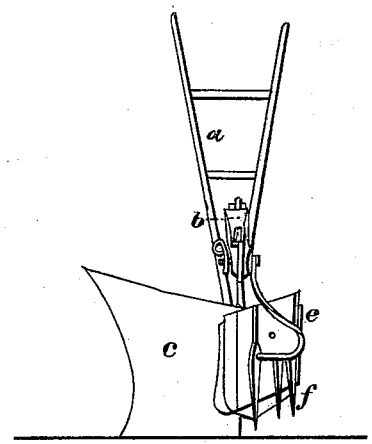

Figure 1 is an elevation of the landside of the cultivator; Fig. 2, a front view, and Fig. 3 parts detached.

The same letters indicate like parts in all the figures.

Many attempts have been made to make a machine that would cultivate cotton; but they have generally been found of little use, being either deficient in covering the plants or else burying them too much. By my improvement I am enabled to work among the cotton with as much facility and expedition as plowing or furrowing can be done elsewhere.

Figure 3:
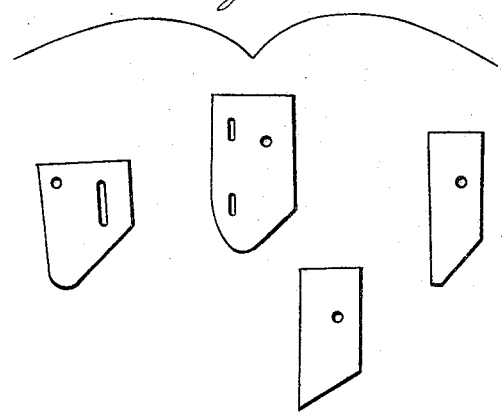

The main part of my cultivator is similar to a common plow. The handles $a$ are connected below the beam $b$. The mold-board $c$ and landside $d$ are of wrought-iron and of the usual form. I form an addition, $e$, to the mold-board, that projects over beyond the landside. (See Fig. 2.) This plate may be made of several parts, as shown in Fig. 3, so as to be extended in any direction, wider or higher, as the nature of the work may require.

Near the end of the beam forward a rake, $f$, is attached to the beam on the landside, which runs in front of the projection $e$. This is formed of several teeth, like harrow-teeth, and placed obliquely one before the other, the first one being farthermost over on the landside.

In operating this cultivator the teeth and projection $e$ above named pass over the rows of cotton plants and divest them of any superfluous earth that may have been thrown upon them. The teeth first knock off the clods and the scraper or projection finishes or levels the work.

Having thus described my improvements, what I claim therein as new, and desire to secure by Letters Patent, is—

The combination of the scraper $e$ and rake or harrow $f$ with the cultivator, in the manner and for the purpose set forth.

JOHN MERRIL CULLEN.

Witnesses:
WM. BATTARLE,
JESSE ALSOP.